United States Patent [19]

Wu et al.

[11] Patent Number: 5,238,620

[45] Date of Patent: Aug. 24, 1993

[54] METHOD FOR MANUFACTURING A GRIP SLEEVE

[76] Inventors: Ching-Fa Wu, No. 26, Mei-Ting St., Pei Tun Dist., Taichung City; Long-Wen Jou, No. 15-12, Hai Wei Tsai Lane, Chung-Yang Rd., Chung Ho Tsun, Lung Ching Hsiang, Taichung Hsien, both of Taiwan

[21] Appl. No.: 895,109

[22] Filed: Jun. 8, 1992

[51] Int. Cl.⁵ .............................................. B29C 67/22
[52] U.S. Cl. .................................. 264/45.3; 264/46.4; 264/46.9; 264/275
[58] Field of Search ................ 273/73 J, 75; 264/46.9, 264/278, 275, 262, 46.4, 45.3

[56] References Cited

U.S. PATENT DOCUMENTS

| | | | |
|---|---|---|---|
| 1,536,288 | 5/1925 | Freelander et al. | 264/46.9 |
| 3,856,603 | 12/1974 | Schaefer et al. | 264/250 |
| 3,989,787 | 11/1976 | Scott, Jr. et al. | 264/262 |
| 4,294,787 | 10/1981 | Lo | 264/46.6 |
| 4,556,438 | 12/1985 | Hoffmeister et al. | 264/46.9 |
| 4,891,175 | 1/1990 | Haines | 264/278 |
| 4,923,537 | 5/1990 | Matsushima | 264/46.9 |

FOREIGN PATENT DOCUMENTS 2217149 9/1974 France .................... 264/46.9

*Primary Examiner*—Allan R. Kuhns
*Attorney, Agent, or Firm*—Wells, St. John, Roberts, Gregory & Matkin

[57] ABSTRACT

A grip sleeve is manufactured by sleeving a tubular nylon fabric lining on a cylindrical mandrel of appropriate length. The mandrel is then provided on a lower mold half which is formed as an elongated shell that is semi-circular in cross-section. The lower mold half has an inner surface which is formed with a pair of spaced and curved radial projections that support the mandrel. An upper mold half is provided on top of the lower mold half and matches with the lower mold half. The upper and lower mold halves cooperate with the mandrel to define an enclosed annular receiving space. One of the upper and lower mold halves is formed with an inlet to access the receiving space. A molding composition of elastomeric foam is introduced into the receiving space via the inlet so as to fill the receiving space. The molding composition solidifies to form an elastic and perspiration holding layer on the fabric lining, thereby producing the grip sleeve.

3 Claims, 4 Drawing Sheets

5,238,620

METHOD FOR MANUFACTURING A GRIP SLEEVE

BACKGROUND OF THE INVENTION

1. Field of the Invention

The invention relates to a for manufacturing a grip sleeve, more part to a grip sleeve manufacturing method which permits the production of high quality grip sleeves at a faster pace.

2. Description of the Related Art

A grip sleeve, such as that disclosed in co-pending U.S. patent application Ser. No. 07/528,430, filed May 25, 1990, now abandoned by the applicants, is usually provided on the grip portion of a racket and is capable of absorbing (and holding) perspiration. Fabrication of the above disclosed grip sleeve usually involves a dipping process, wherein a tubular nylon fabric lining (1) is dipped into a vat (3) which contains a polyurethane (PU) latex solution (2), as shown in FIG. 1. The latex solution (2) solidifies to form a layer of elastic polyurethane foam, thus producing the grip sleeve.

The above described conventional grip sleeve manufacturing process has several drawbacks. Note that the fabric lining (1) is vertically disposed when dipped into the vat (3). When the fabric lining (1) is drawn from the vat (3), uneven distribution of the latex solution (2) on the surface of the fabric lining (1) occurs due to gravity. This results in the production of grip sleeves which are of relatively poor quality. Note further that production of the grip sleeves is achieved at a relatively slow pace since it involves a dipping process. A longer production time can correspondingly increase the manufacturing cost of the grip sleeves.

SUMMARY OF THE INVENTION

Therefore, the main objective of the present invention is to provide a grip sleeve manufacturing method which permits the production of high quality grip sleeves at a faster pace.

Accordingly, the preferred embodiment of a grip sleeve manufacturing method of the present invention comprises the following steps:

sleeving a tubular nylon fabric lining on a cylindrical mandrel of appropriate length;

providing the mandrel on a lower mold half formed as an elongated shell which is semi-circular in cross-section, said lower mold half having an inner surface which is formed with a pair of spaced and curved radial projections to support the mandrel, said fabric lining being disposed between the radial projections;

providing an upper mold half on top of the lower mold half, said upper mold half being matched with the lower mold half, said upper and lower mold halves cooperating with the mandrel to define an enclosed annular receiving space, one of the upper and lower mold halves being formed with an inlet to access the receiving space; and introducing a molding composition of elastomeric foam into the receiving space via the inlet so as to fill the receiving space, said molding composition solidifying to form an elastic and perspiration holding layer on the fabric lining, thereby producing the grip sleeve.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
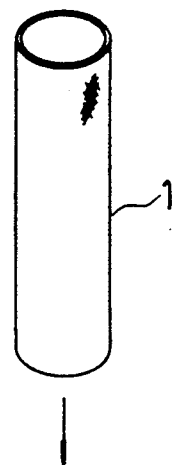
FIG. 1 illustrates how a grip sleeve is conventionally manufactured.
Figure 1:
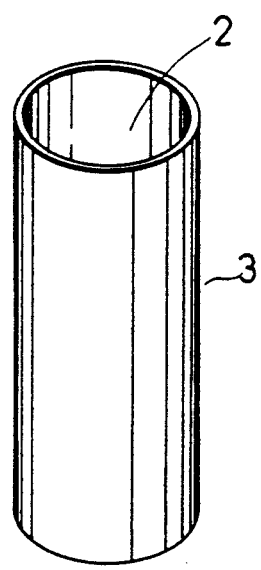
Figure 2A:
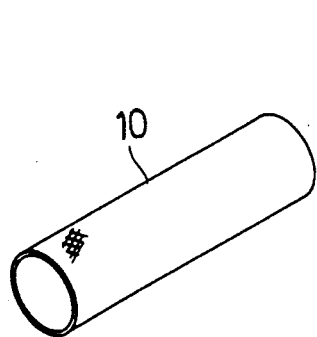
FIGS. 2A to 2E illustrate different stages of the preferred embodiment of a grip sleeve manufacturing method according to the present invention.

Referring to FIGS. 2A to 2E, the preferred embodiment of a grip sleeve manufacturing method according to the present invention comprises the following steps:

1. A fabric lining (10) is fabricated by weaving or knitting elastic nylon strands so as to form a tubular net structure, as shown in FIG. 2A.

Figure 2B:
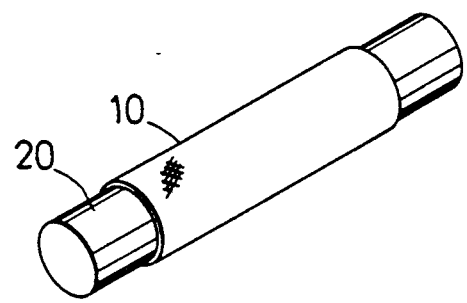

2. The fabric lining (10) is sleeved on a cylindrical mandrel (20) of appropriate length [The mandrel (20) is longer than the fabric lining (10), as shown in FIG. 2B].

Figure 2C:
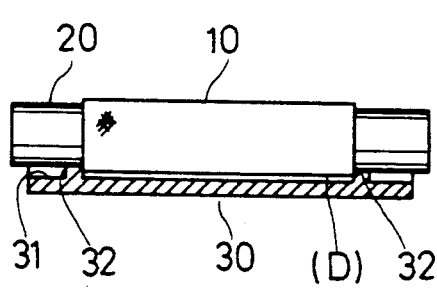
Figure 3:
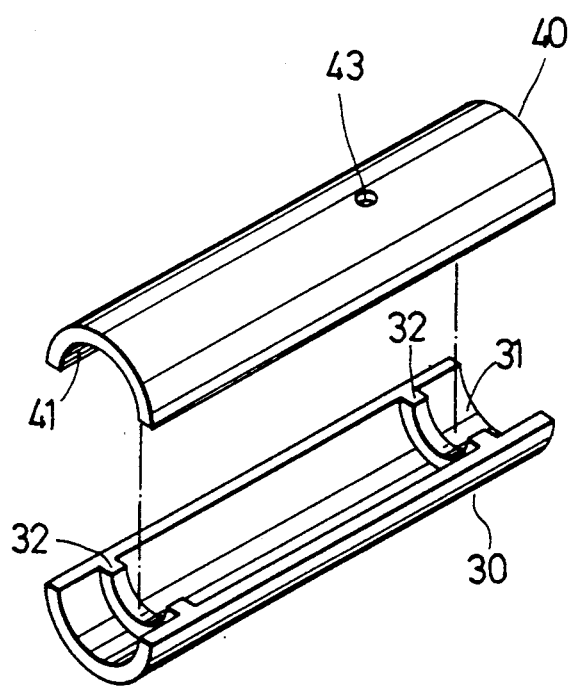
FIG. 3 illustrates upper and lower mold halves of a mold assembly used in the manufacturing method of the present invention.

3. The mandrel (20) is then provided on a lower mold half (30), as shown in FIG. 2C. Referring to FIG. 3, the lower mold half (30) is an elongated shell which is semi-circular in cross-section. The lower mold half (30) has an inner surface (31) which is formed with a pair of spaced and curved radial projections (32). Referring once more to FIG. 2C, the distance between the radial projections (32) is preferably equal to the length of the fabric lining (10). The mandrel (20) and the inner surface (31) of the lower mold half (30) cooperatively define a clearance (D). In actual practice, the construction of the lower mold half (30) may be modified so as to enable the same to accommodate a plurality of mandrel sections (20) simultaneously. This makes it possible to produce grip sleeves at a faster pace, thereby reducing the manufacturing cost of the grip sleeves.

Figure 2D:
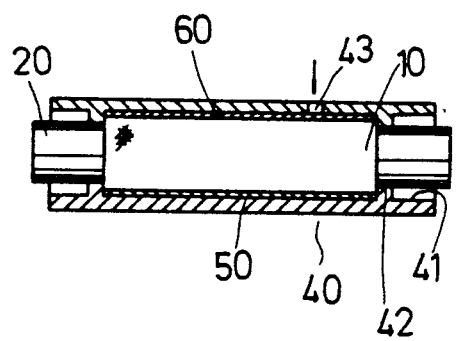

4. An upper mold half (40) is then provided on top of the lower mold half (30), as shown in FIG. 2D. Referring again to FIG. 3, the size and configuration of the upper mold half (40) should correspond to that of the lower mold half (30). Therefore, the upper mold half (40) similarly has an inner surface (41) which is provided with a pair of spaced and curved radial projections (42) that are aligned with the radial projections (32). Referring once more to FIG. 2D, the upper and lower mold halves (40, 30) and the mandrel (20) cooperatively define an enclosed, annular receiving space (50). The upper mold half (40) is further provided with an inlet (43). The inlet may also be formed instead in the lower mold half (30).

Figure 2E:
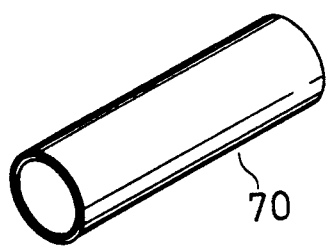

5. A molding composition (60) of elastomeric foam is then introduced into the receiving space (50) via the inlet (43). The molding composition (60) fills the receiving space (50) and solidifies to form an elastic and perspiration holding layer, thus producing a grip sleeve (70), as shown in FIG. 2E. The molding composition (60) may be made of polyurethane (PU) elastomeric foam, polyvinyl chloride (PVC) elastomeric foam or ethylene/vinyl acetate (EVA) elastomeric foam. Short, reinforcing synthetic fibers, such as polyester fibers, nylon fibers, polypropylene fibers or acrylic fibers, may be mixed into the molding composition (60), thereby strengthening the grip sleeve (70).

Figure 4:
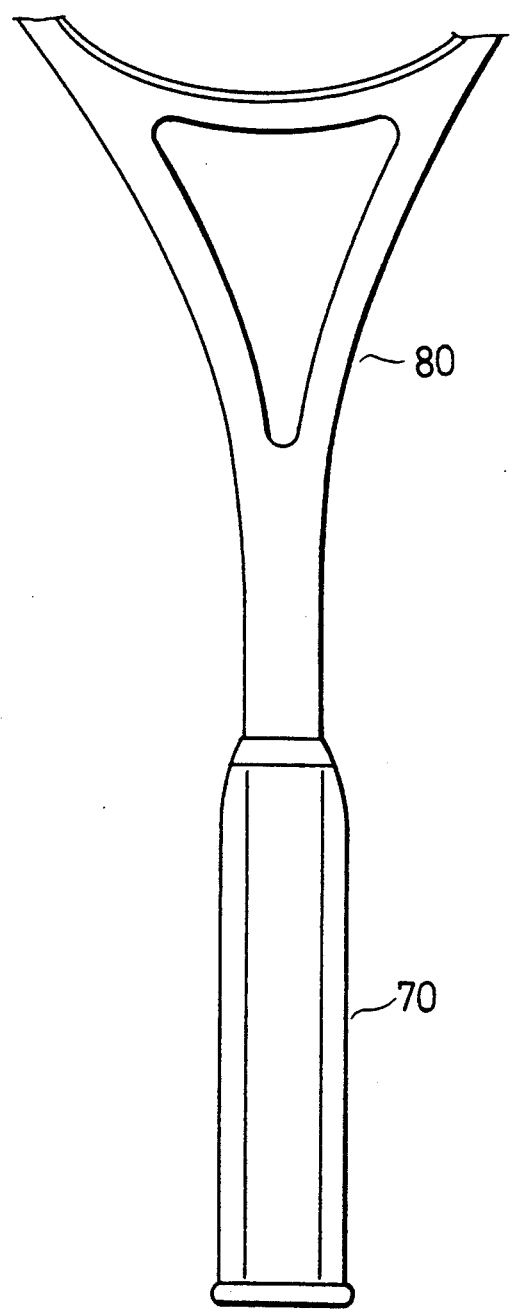
FIG. 4 illustrates a grip sleeve that is manufactured according to the method of the present invention when installed in the grip portion of a racket.

The elastic properties of the grip sleeve (70) permit stretching of the grip sleeve (70) so as to fit the handles of different rackets. Referring to FIG. 4, the grip sleeve (70) is installed by simply slipping the same over the grip portion of a racket (80).

The inner surfaces (31, 41) of the lower and upper mold halves (30, 40) may be formed with pattern grooves so as to emboss a decorative pattern on the surface of the grip sleeve (70), which decorative pattern can help enhance stability in handling the grip portion of the racket (80). Because the cross-section of the annular receiving space (50) is constant, the molding composition (60) is evenly distributed on the surface of the fabric lining (10). The quality of the grip sleeves (70) produced according to the manufacturing method of the present invention is therefore better than that produced in the previously described conventional grip sleeve manufacturing method.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for manufacturing a grip sleeve, comprising the steps of:

sleeving a tubular nylon fabric lining on a cylindrical mandrel of appropriate length;

providing said mandrel on a lower mold half formed as an elongated shell which is semi-circular in cross-section, said lower mold half having an inner surface which is formed with a pair of spaced and curved radial projections to support said mandrel, said fabric lining being disposed between said radial projections;

providing an upper mold half on top of said lower mold half, said upper mold half being matched with said lower mold half, said upper and lower mold halves cooperating with said mandrel to define an enclosed annular receiving space, one of said upper and lower mold halves being formed with an inlet to access said receiving space;

introducing a molding composition of elastomeric foam into said receiving space via said inlet so as to fill said receiving space, said molding composition solidifying to form an elastic and perspiration holding layer on said fabric lining, thereby producing the grip sleeve; and wherein said molding composition is mixed with short, reinforcing synthetic fibers selected from the group consisting of polyester fibers, nylon fibers, polypropylene fibers and acrylic fibers.

2. The method for manufacturing grip sleeves as claimed in claim 1, wherein said molding composition is selected from the group consisting of polyurethane elastomeric foam, polyvinyl chloride elastomeric foam and ethylene/vinyl elastomeric foam.

3. The method of manufacturing grip sleeves as claimed in claim 1, wherein said upper and lower mold halves have inner surfaces which are formed with pattern grooves.

* * * * *